(12) United States Patent
Lee et al.

(10) Patent No.: US 6,279,003 B1
(45) Date of Patent: Aug. 21, 2001

(54) SELF-DESCRIBING MULTIPLE KEY FORMAT DATABASE INDEX

(75) Inventors: Christina Marie Lee; Robert William Lyle; Hsiao Ming Wang, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/218,544

(22) Filed: Dec. 22, 1998

(51) Int. Cl.[7] .................................................. G06F 17/30
(52) U.S. Cl. ................... 707/100; 707/1; 707/101
(58) Field of Search .................... 707/100, 101, 707/1

(56) References Cited

U.S. PATENT DOCUMENTS

| | | | |
|---|---|---|---|
| 4,408,273 | * 10/1983 | Plow | 707/100 |
| 5,404,510 | 4/1995 | Smith et al. | 707/2 |
| 5,644,763 | 7/1997 | Roy | 707/101 |
| 5,729,730 | 3/1998 | Wlaschin et al. | 707/3 |
| 5,745,896 | 4/1998 | Vijaykumar | 707/100 |
| 5,860,070 | * 1/1999 | Tow et al. | 707/8 |

* cited by examiner

Primary Examiner—Paul R. Lintz
(74) Attorney, Agent, or Firm—Gates & Cooper LLP

(57) ABSTRACT

A method, apparatus, article of manufacture, and a memory structure for configuring a database management system to operate with multiple key versions is disclosed.

The method comprises the steps of accessing key information comprising self-describing key data and an associated version indicator, generating key conversion/comparison information from the accessed key information, and storing the key conversion/comparison information in a memory accessible to the database management system. The apparatus comprises a means for performing the above-entitled operations, and the article of manufacture comprises a program storage device tangibly embodying instructions for performing the operations.

45 Claims, 11 Drawing Sheets

Find conversion array entry for version number
Source Key Pointer = Start of Source Key Area
Target Key Pointer = Start of Target Key Area
For I = 1 to last element number
    If Element (I) . type = Copy then Do
        Copy from Source Key Pointer to Target Key Pointer for Element (I) . length
        Source Key Pointer = Source Key Pointer + Element (I) . length
        Target Key Pointer = Target Key Pointer + Element (I) . length
    End
    Else Do
        Propagate Padding character to Target Key Pointer for Element (I) . length
        Target Key Pointer = Target Key Pointer + Element (I) . length
    End
End

FIG. 9

```
STM
BALR
@PS00512  DS      OH
          USING   @PS00512,@11
*         SourceStr (1:20) = DestStr (1:20);
          MVC  SOURCESTR (20,SOURCEPTR), DESTSTR (DESTPTR)
*         SourceStr (21:30) = Pad1 (1:10);
          MVC  SOURCESTR+20(10, SOURCEPTR), PAD1
*         SourceStr (31:40) = DestStr (21:30);
          MVC  SOURCESTR+30(10,SOURCEPTR), DESTSTR+20 (DESTPTR)
*         SourceStr (41:50) = PAD2 (1:10);
          MVC  SOURCESTR+40 (10,SOURCEPTR), PAD2

. . .

@ER00002  LM      @14, @12, 12 (@13)
          BR      @14

PAD1      DC      CL10'         '
PAD2      DC      CL10'         '
```

FIG. 10

SELF-DESCRIBING MULTIPLE KEY FORMAT DATABASE INDEX

CROSS-REFERENCE TO RELATED APPLICATIONS

This application is related to the following co-pending and commonly assigned patent application, which is hereby incorporated by reference herein:

Application Ser. No. 09/218,965, entitled "METHOD AND APPARATUS FOR INDEX KEY VERSIONING," by Christina M. Lee, Robert W. Lyle, Stephen J. Schmandt, Hsiao M. Wang, and Yufen Wang, filed on same date herewith.

BACKGROUND OF THE INVENTION

1. Field of the Invention

The present invention relates to the design and use of database management systems, and in particular to a method and system for configuring a database management system to improve processing speed when operating with multiple key versions.

2. Description of the Related Art

Large-scale integrated database management systems provide an efficient, consistent, and secure means for storing and retrieving vast amounts of data. This ability to manage massive amounts of information has become a virtual necessity in business today. Relational databases, which store retrieve data from tables having a number of rows and columns, are especially widespread.

Key values and indexes are useful features found in most database management systems. Key values are comprised of a single column or multiple columns of the record. Typical key values are account numbers, product codes, and customer names. An index is a structure within the database that can be used to quickly locate data based upon a key value because the key values are ordered. Each key value has at least one record identifier, or pointer, associated with it, which provides access to the entire record in the file. The use of key values and indexes can hasten the processing involved in performing database commands. Another useful feature found in many relational database management systems is the ability to alter the columns or rows of the database tables after the tables have been defined. A typical such alteration might be to increase the length of the character column or to change the data type from a small two-byte integer field to a four-byte integer field.

Unfortunately, if the altered column is a key column or happens to contain a key field, the format of the index key that referenced the table will have changed. As a result, the index will be inaccessible until it is rebuilt to match the new key format stored in the catalog and control structures describing the index. This rebuild may take a considerable amount of time depending on the size of the table.

There is therefore a need for a device and method that allows key columns to be altered, yet avoids the need to rebuild the index after the key columns have been altered. Index versioning satisfies that need, but the processing speed to handle keys in multiple formats can be very slow. A conventional way to process the key is to use a field-by-field comparison for each column in the key, but this results in poor performance for a key with many columns.

In light of the foregoing, there is a need for a method for improving the processing speed of an index with multiple key formats. The present invention satisfies that need.

SUMMARY OF THE INVENTION

To address the requirements described above, the present invention discloses a method, apparatus, article of manufacture, and a memory structure for configuring a database management system to operate with multiple key versions, and for improving the processing speed when using multiple key versions.

The method comprises the steps of accessing key information comprising self-describing key data and an associated version indicator, generating key conversion/comparison information from the accessed key information, and storing the key conversion/comparison information in a memory accessible to the database management system. The apparatus comprises a means for performing the above-entitled operations, and the article of manufacture comprises a program storage device tangibly embodying instructions for performing the operations.

The foregoing uses an index versioning technique to avoid the need to rebuild the index after the key columns have been altered, and allows immediate access to the index. This is made possible because multiple older versions of the key formats are stored inside the index space itself while only the new key format resulting from the alteration is stored in the catalog and the control structures describing the index. Because the index space contains definitions of the older versions of the key formats, the need to maintain multiple versions of the key formats in the catalog is eliminated. Also, because the definitions of all the key formats can be accessed, a key in one format can be converted or compared to a key in a different format. As a result, keys in the new format resulting from the alteration can be inserted into existing indexes that still contain keys in the older formats. In addition, delete and select processing can handle keys in either the old or the new formats. This feature provides immediate availability to the index after the table-altering operation is completed.

Further, the present invention describes a method of pre-analyzing stored key formats and generating a control structure in memory when the index page set is opened. This control structure contains optimized conversion and comparison information that is used at runtime to improve performance when the keys are accessed.

BRIEF DESCRIPTION OF THE DRAWINGS

Referring now to the drawings in which like reference numbers represent corresponding parts throughout:

FIG. 9 is a depiction of one embodiment of pseudocode instructions used to process the conversion/comparison array to convert a key from an old format to a new format; and FIG. 10 is a depiction of OS/390 assembly code that can be used to convert key versions.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
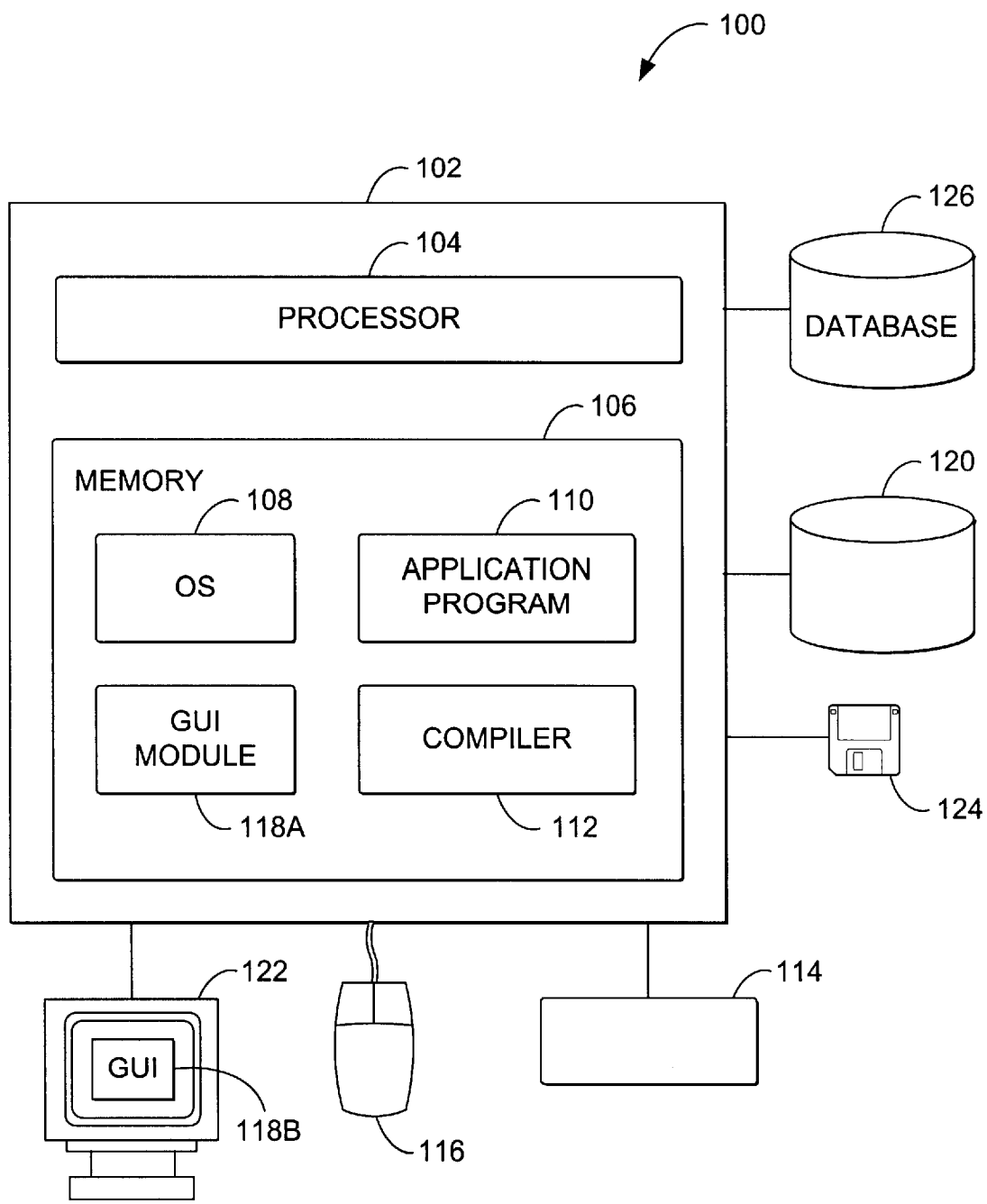
FIG. 1 is a block diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the application program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112. In one embodiment, the computer 102 is communicatively coupled with a database 126, and the application program 110 implements a database management system for storing and retrieving data from the database 126.

Instructions implementing the operating system 108, the computer program 110, and the compiler 112 may be tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Overview

The present invention stores version indicators and associated self-describing data such as key formats in the index directory page. When an index is first created, the version indicator associated with each key format is initialized to zero. Each time a new key format is defined, the old key format and version indicator are recalled from the index catalog and are saved to the index directory page. The version indicator is then incremented to produce a new version indicator. The new version indicator and new key format is then stored in the index directory page and in the index catalog. As a result, the index catalog need only maintain a copy of the version indicator and key format for the latest version, and the index directory page maintains a copy of the previous versions of the key format. Also, because the index space contains definitions of the older versions of the key formats, the need to maintain multiple versions of the key formats in the catalog is eliminated. The information stored in the index directory page can then be used to convert key formats among the multiple versions. This allows different key versions to be logically compared to support delete and select database operations. Hence, the user can perform database operations immediately after altering the database table columns, without rebuilding the index.

Further, the present invention describes a method of pre-analyzing stored key formats and generating a control structure in memory when the index page set is opened. This control structure contains optimized conversion and comparison information that is used at runtime to improve performance when the keys are accessed.

Creating Index Versions

Figure 2:
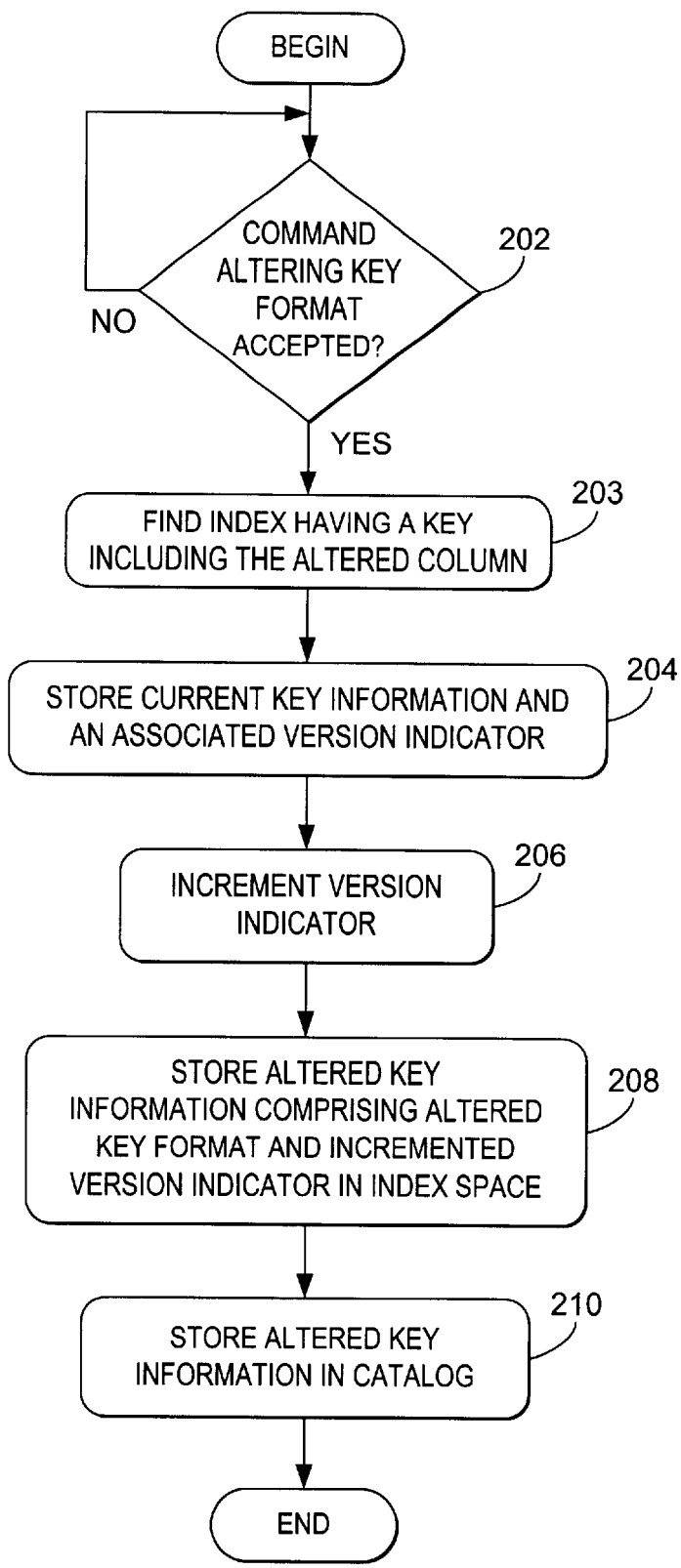
FIG. 2 is a flow chart presenting an illustrative example of process steps used to define and create multiple index versions.

FIG. 2 is a flow chart showing exemplary operations used to define and create multiple index versions. Block 202 checks to see if a command implicating an alteration of a key format has been accepted. The command could be a command to alter a column of a table by changing the data length or data type (i.e. from an integer type to small integer type or a character type), or a command that will ultimately result in the alteration of a key format when completed. If such a command is received, indexes having keys including the altered column are found and self-describing key information about the existing key is stored, as shown in blocks 203 and 204. The self-describing key information comprises information from which the key format can be derived and an associated version indicator, and may include, for example, flags (indicating whether the data is nullable, ascending, or descending), the data type (character, integer, etc.), and the data length. The version indicator is then incremented, and the altered key information (including the new self-describing key information and the incremented version indicator) is stored in the index space. Then, the altered key information is stored in the catalog 410. These operations are illustrated as blocks 206, 208, and 210. The catalog stores information about the indexes that is used to support the search and optimization functions of the database management system. Typically, the catalog stores index names, run statistics, leaf page information, and other data.

Figure 3:
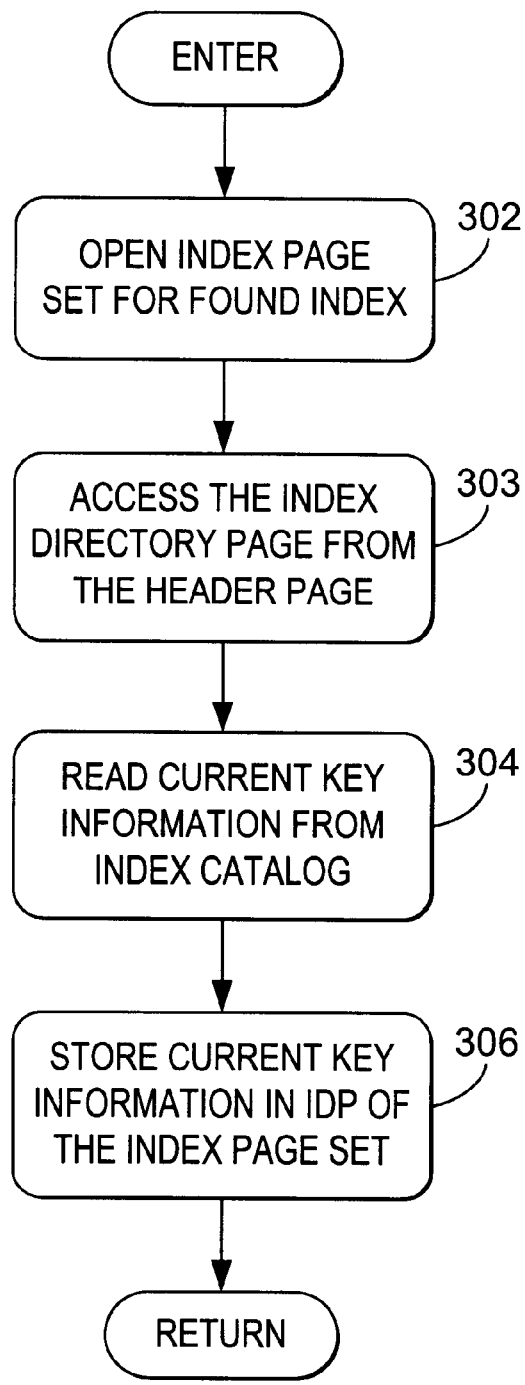
FIG. 3 is a flow chart depicting exemplary operations performed to store existing key information.

FIG. 3 is a flow chart depicting exemplary operations performed to store the existing key information as shown in block 204. First, an index page set for the found indexes (those that were affected by the alteration of the table column) is opened, as depicted in block 302. Then, an index directory page is accessed from a header page in the index page set, as shown in block 303. Information about the existing key is then read from an index catalog, as depicted in block 304.

Figure 4:
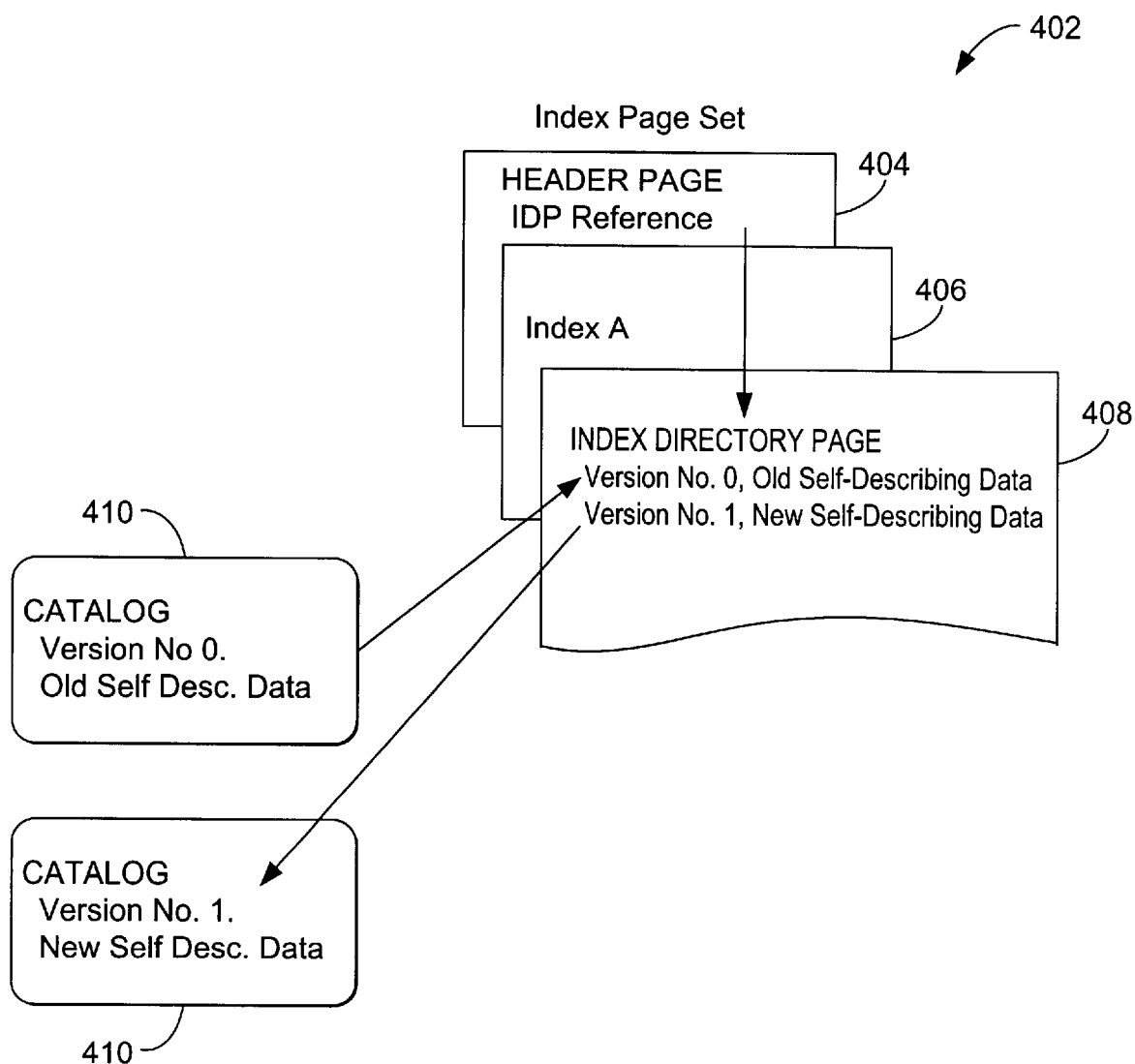
FIG. 4 is a diagram showing an exemplary structure for the index page set.

FIG. 4 is a diagram showing an exemplary structure of the index page set 402. The index page set 402 comprises a header page 404 having a reference to an index directory page (IDP) 408, and one or more plurality of index pages 406. The IDP 408 stores version indicators and key self-describing data.

Returning to FIG. 3, after the information about the existing key is retrieved from the index catalog 410, the information is stored in an index directory page 408 in the index page set 402 of the index space. This is depicted in block 306.

Figure 5:
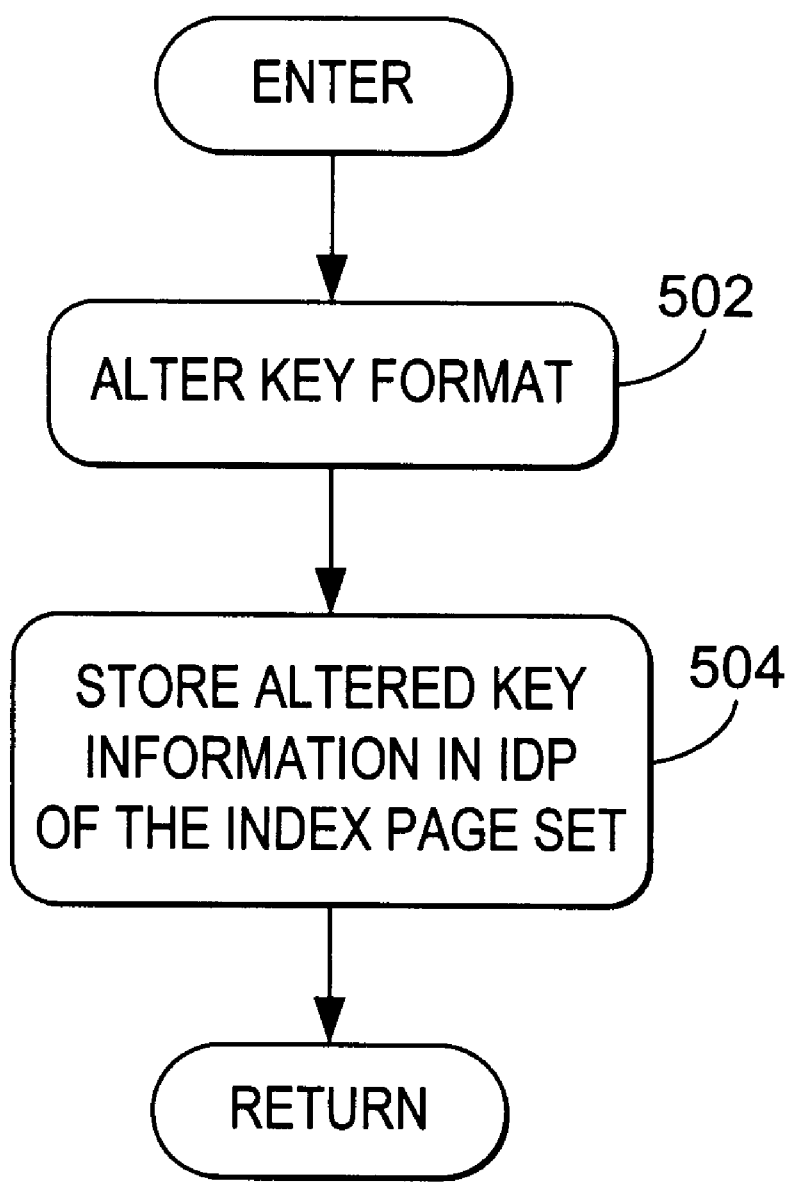
FIG. 5 is a flow chart showing exemplary operations performed to store altered key information in the index page set.

FIG. 5 is a flow chart depicting exemplary operations performed to store altered key information in the index page set 402. First, the key format is altered 502. Then, the altered key information is stored in the index directory page 408 of the index page set 402, as shown in block 504.

FIG. 4 shows a visual example of the foregoing operations. After a command implicating a key change has been accepted, the current version indicator (Version No. 0) and the "old" self-describing data (self-describing key data before the alteration was accepted) is stored in the IDP 408. The incremented version indicator (Version No. 1) and the new (altered) self-describing data is stored in the IDP 408, and also in the index catalog. In the exemplary embodiment illustrated in FIG. 3, the version indicator is an integer that begins at zero and is incremented by one each time a new key version is created. However, the version indicator may comprise one or more alphanumeric characters in addition to or instead of integers, in which case, the incrementing of the version indicator involves setting the version indicator to its next value.

Accessing Index Versions

The foregoing describes the storing of different index versions so that the index referring to tables with altered key columns may be used without rebuilding. Once the index versions have been stored, they may be used in a manner that is transparent to the users of the database because any keys used as input are interpreted and/or converted to the current format before being submitted to the Index Manager. During insert processing into a leaf or a non-leaf page, a prefix containing the current version indicator is added to the key in the new format. The index entries that existed in the leaf and non-leaf pages before the first alter operation do not have a version indicator but are considered to have the version indicator of the oldest format stored in the IDP 408.

Figure 6:
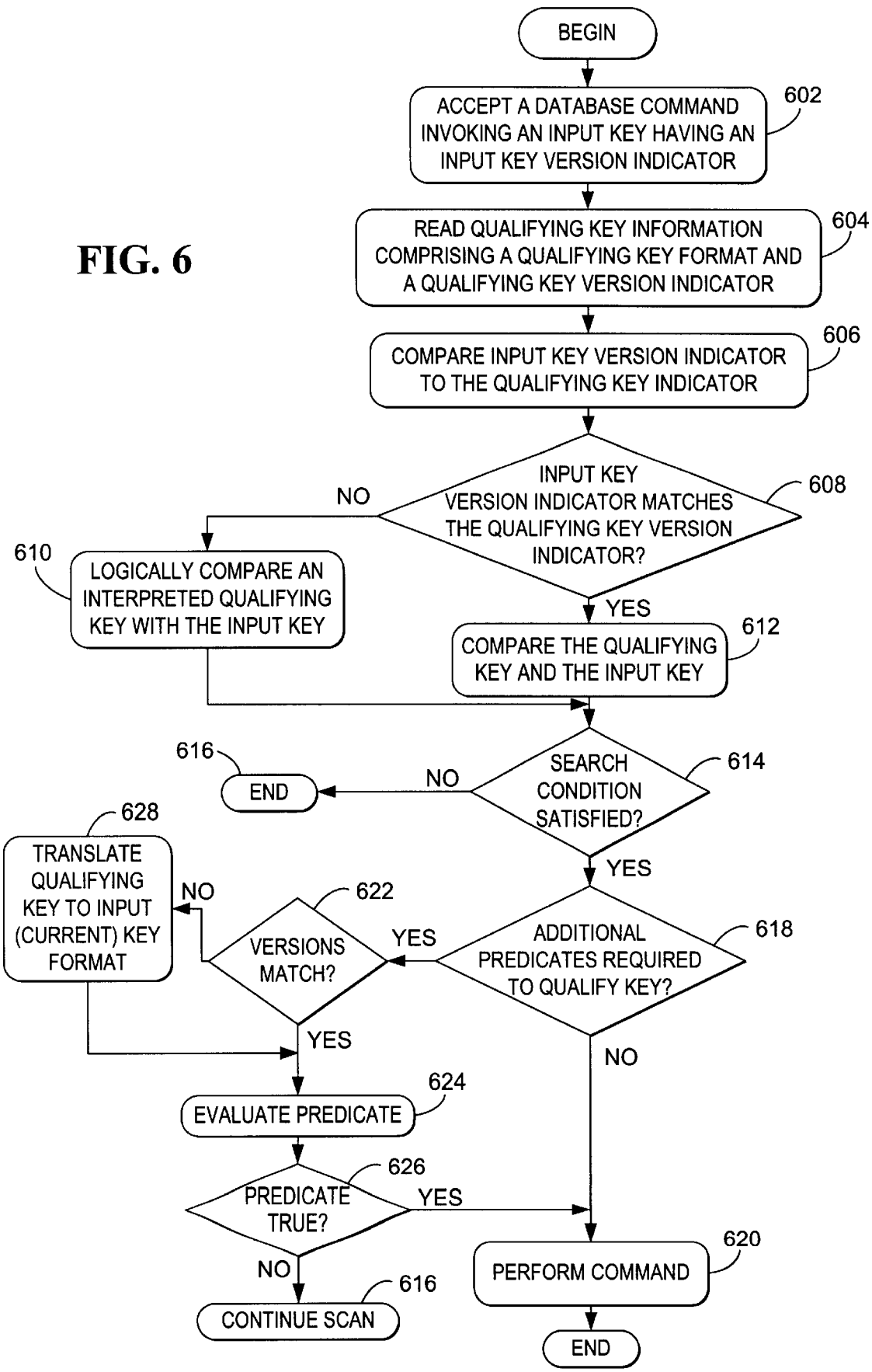
FIG. 6 is a flow chart depicting exemplary operations used in performing database operations using index versioning.

FIG. 6 is a flow chart depicting the operations undertaken in performing database operations using index versioning. The process begins when the user issues a command (such as a SQL "select" or "delete" command) that invokes an input key having an input key version indicator. This is depicted in block 602. The input key is used to search qualifying keys to find those keys that match the search criteria in the command.

During "select" and "delete" processing, the input key is in the newest format corresponding to the current version indicator. This is accomplished by invalidating plans after the alter operation. The index page 406 is scanned by the Index Manager, reading qualifying information and comparing the version indicator of the qualifying key to the version indicator of the input key. This is depicted in blocks 604 and 606, which can be used to search the non-leaf pages during tree traversal as well as to search the leaf pages.

If the version indicator of the qualifying key matches the version indicator of the input key, the qualifying key and the input key are compared, as shown in blocks 608 and 612. If the version indicator for the input key does not match the version indicator for the qualifying key, the qualifying key is interpreted and logically compared with the input key, as shown in block 610. The qualifying key is interpreted when the Index Manager matches the version indicator of the qualifying key to the version indicator stored in the index directory page (IDP) 408 that corresponds to the qualifying key format. For example, if the input key version indicator was a "1," and the qualifying key version indicator was "0", the "0" version format of the qualifying key is used to perform the logical comparison against the "1" version of the input key. This allows a logical comparison between the two keys, even though the keys may be physically different.

Block 614 tests to see whether after the comparison described above, the input key and the qualifying key satisfy the search condition. If not, a match has not been found and the command ends. If the input key and the qualifying key satisfy the search condition, logic passes to block 618, which tests to determine whether additional predicates must be applied to qualify the key. If no predicates must be applied, the command is performed as shown in block 620.

If additional predicates must be applied, block 622 tests to see if the version indicators for the qualifying key and the input key match. If they do, the predicate is evaluated, as shown in block 624. Then, if the predicate evaluates as true, the command is performed, as shown in blocks 626 and 620. If predicate evaluates as false, the scan continues, as depicted in block 616. If the operation shown in block 622 indicates that the versions of the qualifying key and the input key do not match, the qualifying key is converted into the input (current) key format, as shown in block 628, and the predicate is evaluated as described above.

As an illustration of the step of performing the command 620, consider the processing required for database "delete" and "select" commands. If the key qualifies and the database command was a "delete" command, the key can be deleted without converting the key to the current format. If the key qualifies and the command was a "select" command, the key must be converted to the current format before it is retrieved for output.

It is worthy to note that the additional logic to process the keys in different formats will slow down the performance of the index access. However, rebuilding the index will convert all of the keys to the newest format and eliminate the version indicator on the keys, and index access performance will return to normal. Index versioning is used to avoid any unavailability of the index after the alter operation and provides the ability to access the index in a transitional state until the index can be rebuilt.

Building and Using an Index Descriptor

Figure 7A:
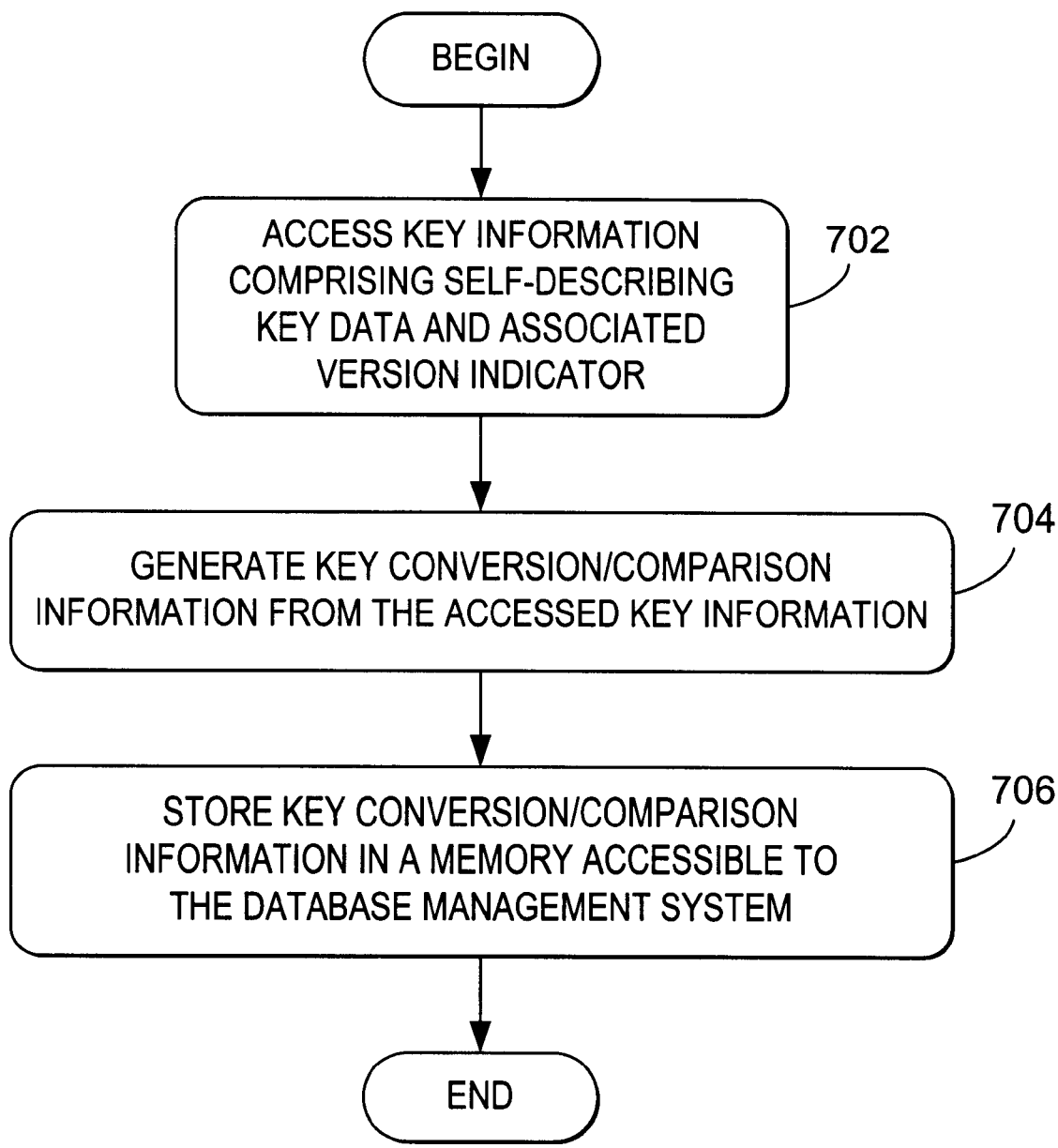
FIG. 7A is a flow chart depicting exemplary operations used in building and using an index descriptor.

FIG. 7A is a flow chart depicting exemplary operations used in building and using an index descriptor to improve processing performance. At this point, the columns of the key have been altered, and the index versioning techniques described above have been employed to store the new and old key formats. While this key information could be stored in the index catalog 410, or a separate control structure, the key information is stored in the index space in the index directory page 408. When the index page set 402 is opened, the key information stored therein (including self-describing key data and an associated version indicator for each version of the key) is accessed. This is depicted in block 702. The accessed information is then analyzed and used to generate optimized key translation information (which includes information for converting and/or comparing key versions), as shown in block 704. In one embodiment, this key conversion/comparison information is stored in a control structure such as an index descriptor (IXD) which is built dynamically in memory when the index page set 402 is opened.

Figure 7B:
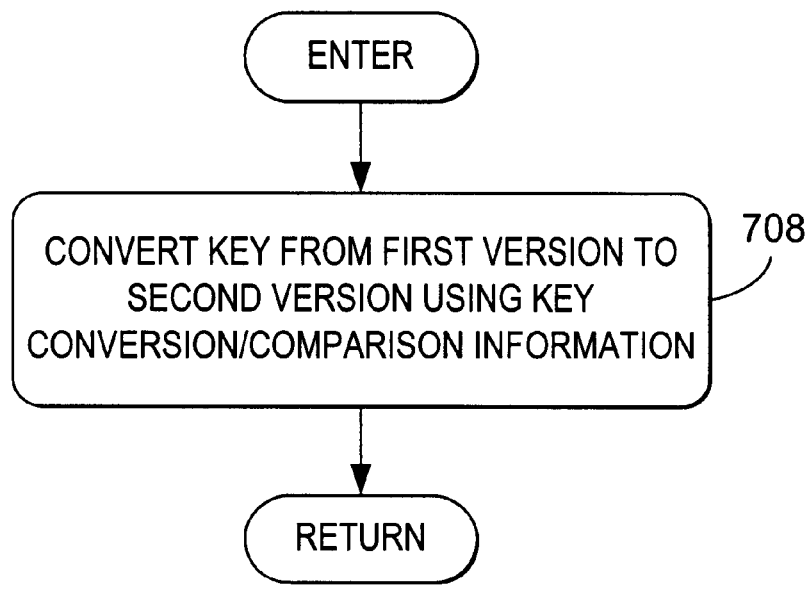
FIG. 7B is a flow chart depicting exemplary operations used in converting a key from one version to another.

FIG. 7B is a flow chart depicting the conversion of a key from a first version to a second version using key conversion/comparison information.

Figure 7C:
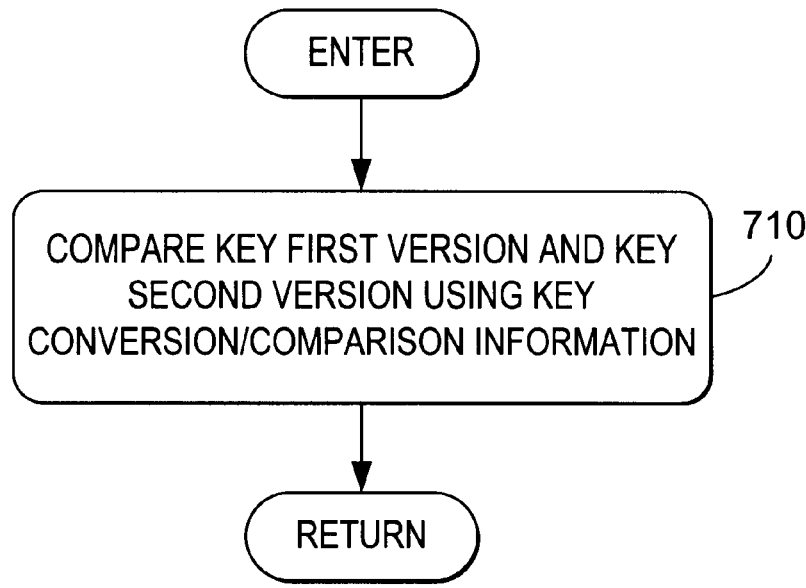
FIG. 7C is a flow chart depicting exemplary operations used in comparing keys of different versions.

FIG. 7C is a flow chart depicting the comparison of a first version of a key with a second version of the key using the key conversion/comparison information. It should be noted that the use of the terms "first" and "second" versions in the foregoing figures and accompanying discussion does not refer to the actual version indicators of the respective keys, nor is the scope of the invention so limited. Rather, the present invention permits the conversion and comparison of any key version to any other key version. Hence, the terms "first key" when used in this context, refer to any key version, and the terms "second key" refers to any other key version.

Because this key conversion/comparison information is then stored 706 in the computer memory 106, it can be quickly accessed to convert or compare keys in older version formats to keys in the current version format. Once the index page set 402 is opened, the key conversion and comparison information is retained in the memory 106, where it can be repeatedly used to process the keys until the index page set 402 is closed. This avoids the I/O cost of having to read the key conversion and comparison information more than once while the index page set 402 is open. If the index page set 402 is closed and re-opened, the key conversion and comparison information is dynamically rebuilt in memory 106 once again.

To illustrate the foregoing, consider a key composed of three columns (character, varying length character, and a character), and with three different stored formats. In this example, the varying length character column is always padded to the maximum length in the index key. A version indicator is associated with each key format and self-describing data, and stored per column of the key. Such self-describing data can include flags (such as if the data is nullable, ascending, or descending), the data type (e.g. character, integer) and the length of the data.

Figure 8:
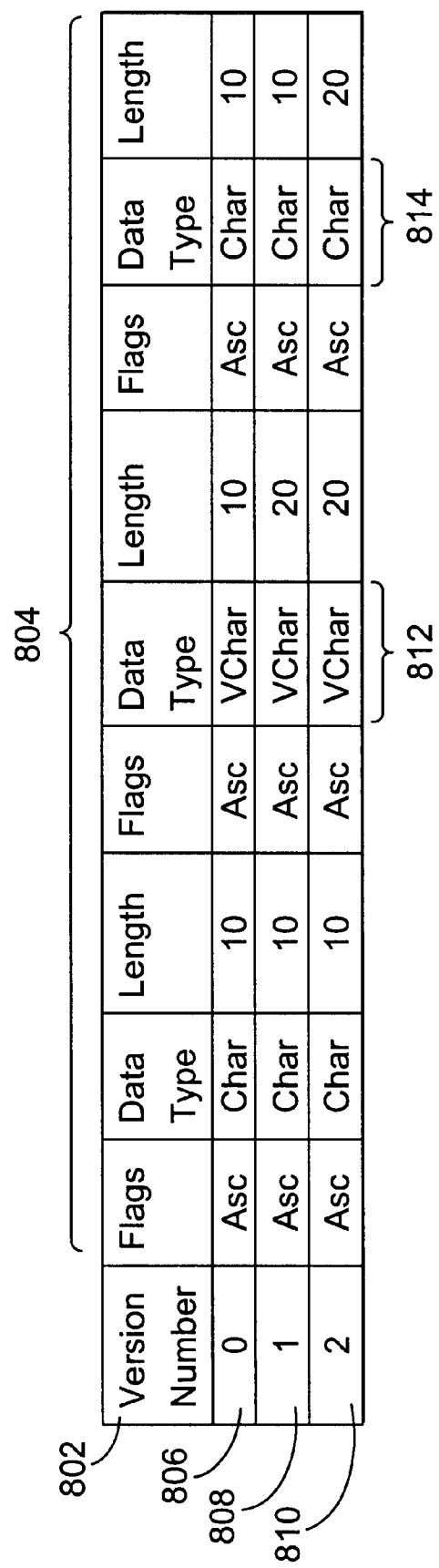
FIG. 8 is a table showing an exemplary key with a version indicator and self-describing data.

FIG. 8 presents a table showing the foregoing key example, including the version indicator 802 and the self-describing data 804. In this example, the original key format 806 corresponds to Version 0. The varying length character column 812 was then altered from 10 to 20 bytes to produce the second key format 808 (Version 1). The last data type 814 was then altered from 10 to 20 bytes to form the third key format 810 (Version 2).

In one embodiment, the step of generating key conversion/comparison information is performed by generating a conversion/comparison array in the IXD. To convert a key from Version 0 to Version 2, the array would contain the entries or elements shown in Table I below:

TABLE I

| Operation | Argument |
|---|---|
| Copy | 20 bytes |
| Pad | 10 bytes |
| Copy | 10 bytes |
| Pad | 10 bytes |

If a Version 0 of the key 806 is being converted to Version 2 of the key 808, the first 20 bytes of the Version 0 key 806 is copied to a target key area via the "copy" operation. This includes the 10-byte character ("char") field and 10 bytes of the VChar field. However, because the Version 2 key format contains a VChar field 812 with an extra 10 bytes that are absent from Version 0 of the key 806, one or more padding characters must be propagated via the "pad" operation to the target key area to fill in the extra 10 bytes that do not exist in Version 0 of the key. This process is repeated for the last Char field 814 as well.

Table II below presents an array that could be used to compare a key in the Version 1 format with a key in the Version 2 format.

TABLE II

| Operation | Argument |
|---|---|
| Compare | 10 bytes |
| Compare | 20 bytes |
| Compare | 10 bytes |
| Pad | 10 bytes |

Although key formats are normally analyzed field by field as shown above, consecutive fields needing similar actions can be grouped together in one "compare" array operation thereby increasing performance, as shown in Table III below:

TABLE III

| Operation | Argument |
|---|---|
| Compare | 40 bytes |
| Pad | 10 bytes |

Using the array shown in Table III, the first 40 bytes of the Version 1 key 808 would be compared to the first 40 bytes of the Version 2 key 810. If the comparison is equal, then the last 10 bytes of the Version 2 key 810 are compared to 10 bytes of padding data since the extra 10 bytes do not exist in the Version 1 key 808.

Referring back to FIG. 6, the performance of block 610 is improved by using the operations performed by block 710. Likewise, the performance of blocks 624, 628 can be improved by using the operations depicted in block 708.

FIG. 9 depicts one embodiment of pseudocode instructions that can be used to process the conversion/comparison array to convert a key from an old format to a new format.

In one embodiment of the present invention, the key conversion/comparison information comprises actual comparison and/or conversion code for each format, which is stored directly in the IXD control structure. This embodiment can result in even faster performance then that which can be achieved with the conversion/comparison array, because the conversion/comparison code can be executed directly.

FIG. 10 depicts OS/390 assembly code that can be used to convert a key from Version 0 to Version 2. Using the foregoing teaching, assembly code for other computer/ operating systems can also be generated, as required.

Conclusion

This concludes the description of the preferred embodiments of the present invention. In summary, the present invention describes a method, apparatus, article of manufacture, and a memory structure for configuring a database management system to operate with multiple key versions, and for improving the processing speed when using multiple key versions.

The method comprises the steps of accessing key information comprising self-describing key data and an associated version indicator, generating key conversion/ comparison information from the accessed key information, and storing the key conversion/comparison information in a memory accessible to the database management system. The apparatus comprises a means for performing the above-entitled operations, and the article of manufacture comprises a program storage device tangibly embodying instructions for performing the operations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of configuring a database management system to operate with multiple key versions, comprising the steps of:

accessing key information, the key information comprising self-describing key data and an associated version indicator for each key version;

generating key translating information from the accessed key information; and storing the key translating information in a memory accessible to the database management system.

2. The method of claim 1, wherein the key translating information comprises key conversion information, and the method further comprises the step of converting a key from a first version to a second version using the key conversion information.

3. The method of claim 2, wherein the step of generating key conversion information from the accessed key information comprises the step of dynamically building a control structure comprising the key conversion information.

4. The method of claim 3, wherein the step of generating key conversion information from the accessed key information comprises the step of generating an array, the array comprising elements describing a relationship between key versions.

5. The method of claim 4, wherein the elements comprise at least one command and an associated argument to change a data attribute.

6. The method of claim 5, wherein the step of converting a key from a first version to a second version using the conversion information comprises the step of processing the array according to the command and argument.

7. The method of claim 2, wherein the step of generating key conversion information from the accessed key information comprises the step of generating code.

8. The method of claim 7, wherein the step of converting a key from a first version to a second version using the conversion information comprises the step of executing the code.

9. The method of claim 1, wherein the key translating information comprises key comparison information, and the method further comprises the step of comparing a first version of a key to a second version of the key.

10. The method of claim 9, wherein the step of generating key comparison information from the accessed key information comprises the step of dynamically building a control structure comprising the key comparison information.

11. The method of claim 9, wherein the step of generating key comparison information from the accessed key information comprises the step of generating an array, the array comprising elements describing a relationship between key versions.

12. The method of claim 11, wherein the elements comprise at least one command and an associated argument to change a data attribute.

13. The method of claim 12, wherein the step of comparing a first version of a key to a second version of the key comprises the step of processing the array according to the command and argument.

14. The method of claim 9, wherein the step of generating key comparison information from the accessed key information comprises the step of generating code.

15. The method of claim 14, wherein the step of converting a key from a first version to a second version using the conversion information comprises the step of executing the code.

16. An apparatus for configuring a database management system to operate with multiple key versions, comprising:

means for accessing key information, the key information comprising self-describing key data and an associated version indicator for each key version;

means for generating key translating information from the accessed key information; and means for storing the key translating information in a memory accessible to the database management system.

17. The apparatus of claim 16, wherein the key translating information comprises key conversion information, and the apparatus further comprises means for converting a key from a first version to a second version using the key conversion information.

18. The apparatus of claim 17, wherein the means for generating key conversion information from the accessed key information comprises means for dynamically building a control structure comprising the key conversion information.

19. The apparatus of claim 18, wherein the means for generating key conversion information from the accessed key information comprises means for generating an array, the array comprising elements describing a relationship between key versions.

20. The apparatus of claim 19, wherein the elements comprise at least one command and an associated argument to change a data attribute.

21. The apparatus of claim 20, wherein the means for converting a key from a first version to a second version using the conversion information comprises means for processing the array according to the command and argument.

22. The apparatus of claim 17, wherein the means for generating key conversion information from the accessed key information comprises means for generating code.

23. The apparatus of claim 22, wherein the means for converting a key from a first version to a second version using the conversion information comprises means for executing the code.

24. The apparatus of claim 16, wherein the key translating information comprises key comparison information, and the apparatus further comprises means for comparing a first version of a key to a second version of the key.

25. The apparatus of claim 24, wherein the means for generating key comparison information from the accessed key information comprises means for dynamically building a control structure comprising the key comparison information.

26. The apparatus of claim 24, wherein the means for generating key comparison information from the accessed key information comprises means for generating an array, the array comprising elements describing a relationship between key versions.

27. The apparatus of claim 26, wherein the elements comprise at least one command and an associated argument to change a data attribute.

28. The apparatus of claim 27, wherein the means for comparing a first version of a key to a second version of the key comprises means for processing the array according to the command and argument.

29. The apparatus of claim 24, wherein the means for generating key comparison information from the accessed key information comprises means for generating code.

30. The apparatus of claim 29, wherein the means for converting a key from a first version to a second version using the conversion information comprises means for executing the code.

31. A program storage device, readable by a computer, tangibly embodying at least one program of instructions executable by the computer to perform method steps of configuring a database management system to operate with multiple key versions, the method comprising the steps of:

accessing key information, the key information comprising self-describing key data and an associated version indicator for each key version;

generating key translating information from the accessed key information; and storing the key translating information in a memory accessible to the database management system.

32. The program storage device of claim 31, wherein the key translating information comprises key conversion information, and the method steps further comprise the step of converting a key from a first version to a second version using the key conversion information.

33. The program storage device of claim 32, wherein the method step of generating key conversion information from the accessed key information comprises the method step of dynamically building a control structure comprising the key conversion information.

34. The program storage device of claim 33, wherein the method step of generating key conversion information from the accessed key information comprises the method step of generating an array, the array comprising elements describing a relationship between key versions.

35. The program storage device of claim 34, wherein the elements comprise at least one command and an associated argument to change a data attribute.

36. The program storage device of claim 35, wherein the method step of converting a key from a first version to a second version using the conversion information comprises the method step of processing the array according to the command and argument.

37. The program storage device of claim 32, wherein the method step of generating key conversion information from the accessed key information comprises the method step of generating code.

38. The program storage device of claim 37, wherein the method step of converting a key from a first version to a second version using the conversion information comprises the method step of executing the code.

39. The program storage device of claim 31, wherein the key translating information comprises key comparison information, and the method steps further comprise the method step of comparing a first version of a key to a second version of the key.

40. The program storage device of claim 39, wherein the method step of generating key comparison information from the accessed key information comprises the method step of dynamically building a control structure comprising the key comparison information.

41. The program storage device of claim 39, wherein the method step of generating key comparison information from the accessed key information comprises the method step of generating an array, the array comprising elements describing a relationship between key versions.

42. The program storage device of claim 41, wherein the elements comprise at least one command and an associated argument to change a data attribute.

43. The program storage device of claim 42, wherein the method step of comparing a first version of a key to a second version of the key comprises the method step of processing the array according to the command and argument.

44. The program storage device of claim 39, wherein the method step of generating key comparison information from the accessed key information comprises the method step of generating code.

45. The program storage device of claim 44, wherein the method step of converting a key from a first version to a second version using the conversion information comprises the method step of executing the code.

* * * * *